(12) United States Patent
Wang et al.

(10) Patent No.: US 7,920,795 B2
(45) Date of Patent: *Apr. 5, 2011

(54) METHOD AND APPARATUS FOR TRANSMITTING MULTIPLE CHANNELS IN A WAVELENGTH DIVISION MULTIPLEXED (WDM) OPTICAL COMMUNICATION SYSTEM WITH REDUCED RAMAN CROSSTALK AND NONLINEAR DISTORTIONS

(75) Inventors: Jun Wang, Horsham, PA (US); Kerry I. Litvin, Huntingdon Valley, PA (US)

(73) Assignee: General Instrument Corporation, Horsham, PA (US)

( * ) Notice: Subject to any disclaimer, the term of this patent is extended or adjusted under 35 U.S.C. 154(b) by 763 days.

This patent is subject to a terminal disclaimer.

(21) Appl. No.: 11/697,071

(22) Filed: Apr. 5, 2007

(65) Prior Publication Data

US 2008/0247756 A1    Oct. 9, 2008

(51) Int. Cl.
*H04B 10/04* (2006.01)

(52) U.S. Cl. ............ 398/188; 398/79; 398/183; 359/334

(58) Field of Classification Search ............ 398/79, 398/182, 183, 188, 192, 193, 194, 195, 196, 398/197, 198, 72, 68, 90, 91, 115, 66, 67, 398/71, 74, 75; 359/334
See application file for complete search history.

(56) References Cited

U.S. PATENT DOCUMENTS

| | | | |
|---|---|---|---|
| 5,841,557 A | 11/1998 | Otsuka et al. | |
| 5,847,862 A | 12/1998 | Chraplyvy et al. | |
| 6,516,113 B1 | 2/2003 | Glingener et al. | |
| 6,556,736 B2 | 4/2003 | Doerr et al. | |
| 6,606,178 B1 | 8/2003 | Rhee et al. | |
| 6,912,073 B2 | 6/2005 | Wildeman et al. | |
| 7,271,948 B1 * | 9/2007 | Wang et al. | 359/334 |
| 2002/0197036 A1 | 12/2002 | Kim et al. | |
| 2004/0136646 A1 | 7/2004 | Sharar et al. | |
| 2004/0184819 A1 | 9/2004 | Vassilieva et al. | |
| 2009/0310967 A1 * | 12/2009 | Wang et al. | 398/69 |

OTHER PUBLICATIONS

PCT Search Report & Written Opinion, RE: Application #PCT/US08/59395 Dec. 12, 2008.
PCT Search Report and Written Opinion, RE: Application #PCT/US2009/046561—Jul. 29, 2009.

* cited by examiner

*Primary Examiner* — Hanh Phan
(74) *Attorney, Agent, or Firm* — Larry T. Cullen (57) ABSTRACT

A method and apparatus is provided for transmitting a WDM optical signal. The method begins by modulating an odd number of optical channels that are each located at a different wavelength from one another with (1) a respective one of a plurality of information-bearing electrical signals that all embody the same broadcast information and (2) a respective one of a plurality of RF signals having a common functional broadcast waveform, at least one of the RF signals being out of phase with respect to remaining ones of the plurality of RF signals. Each of the modulated optical channels are multiplexed to form a WDM optical signal. The WDM optical signal is forwarded onto an optical transmission path.

23 Claims, 5 Drawing Sheets

METHOD AND APPARATUS FOR TRANSMITTING MULTIPLE CHANNELS IN A WAVELENGTH DIVISION MULTIPLEXED (WDM) OPTICAL COMMUNICATION SYSTEM WITH REDUCED RAMAN CROSSTALK AND NONLINEAR DISTORTIONS

FIELD OF THE INVENTION

The invention relates generally to the transmission of multiple communication channels using wavelength division multiplexed (WDM) optical signals. More particularly, the invention relates to a method and apparatus which utilizes destructive interference to reduce Raman induced crosstalk and nonlinear signal distortions between the optical channels.

BACKGROUND OF THE INVENTION

MSOs (multi-service operators) provide several services to end users through a fiber optic network, with the final connection to the user through a coaxial connection. The services provided by the MSO typically include broadcast analog video and narrow cast digital services, such as data, VoIP, subscription, pay per view and video on demand (VOD) services. The services are generally allocated a portion of an optical channel, which typically has approximately 1 GHz bandwidth available. While the bandwidth of a channel is generally constrained by the optical network (the optical network transmitters, optical fiber, channel filter bandwidths and coaxial connection), the number of users connected to the optical network continues to increase, which requires increased demand for bandwidth for the desired services.

In recent years wavelength division multiplexed (WDM) optical transmission systems have been increasingly deployed in optical networks to meet the increased demand for bandwidth by providing more than one optical channel over the same optical fiber. The WDM techniques include coarse wavelength division multiplexed (CWDM) and dense wavelength division multiplexed (DWDM) systems. Whether a system is considered to be CWDM or DWDM simply depends upon the optical frequency spacing of the channels utilized in the system.

Figure 3:
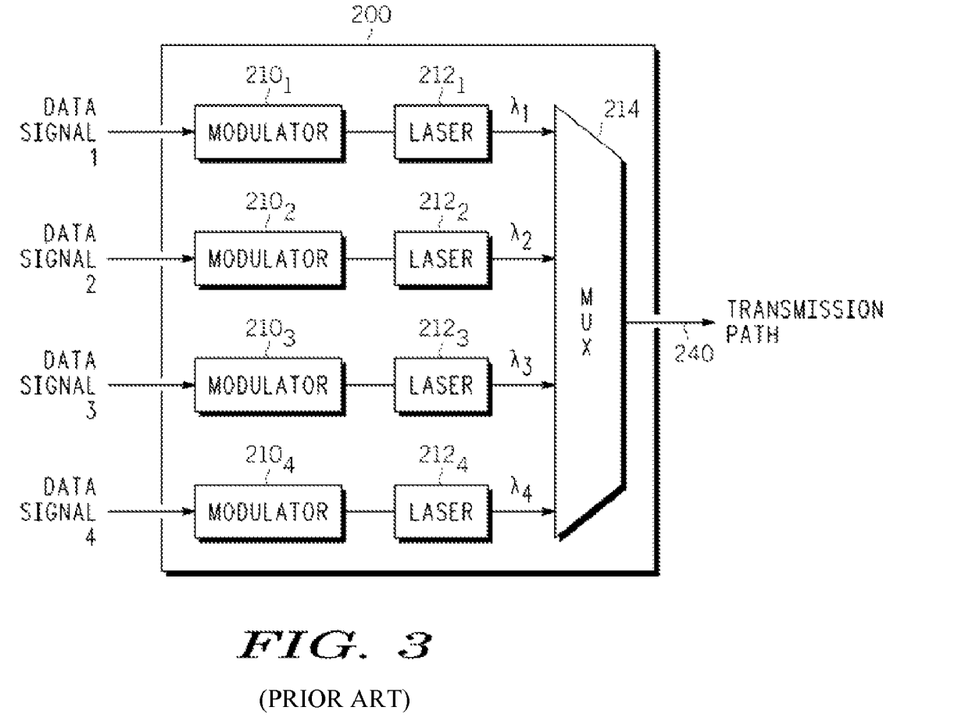
FIG. 3 shows a simplified block diagram of a conventional WDM transmission arrangement.

FIGS. 3 and 4 show simplified block diagrams of conventional WDM transmission arrangements. As illustrated in FIG. 3, data or other information-bearing signals S1, S2, S3 and S4 are respectively applied to the inputs of modulators 2101, 2102, 2103, and 2104. The modulators 2101, 2102, 2103, and 2104, in turn, drive lasers 2121, 2122, 2123, and 2124, respectively. The lasers 2121, 2122, 2123, and 2124 generate data modulated optical channels at wavelengths λ1, λ2, λ3 and λ4, respectively, where λ4>λ3>λ2>λ1. A wavelength division multiplexer (WDM) 214 receives the optical channels and combines them to form a WDM optical signal that is then forwarded onto a single optical transmission path 240.

Figure 4:
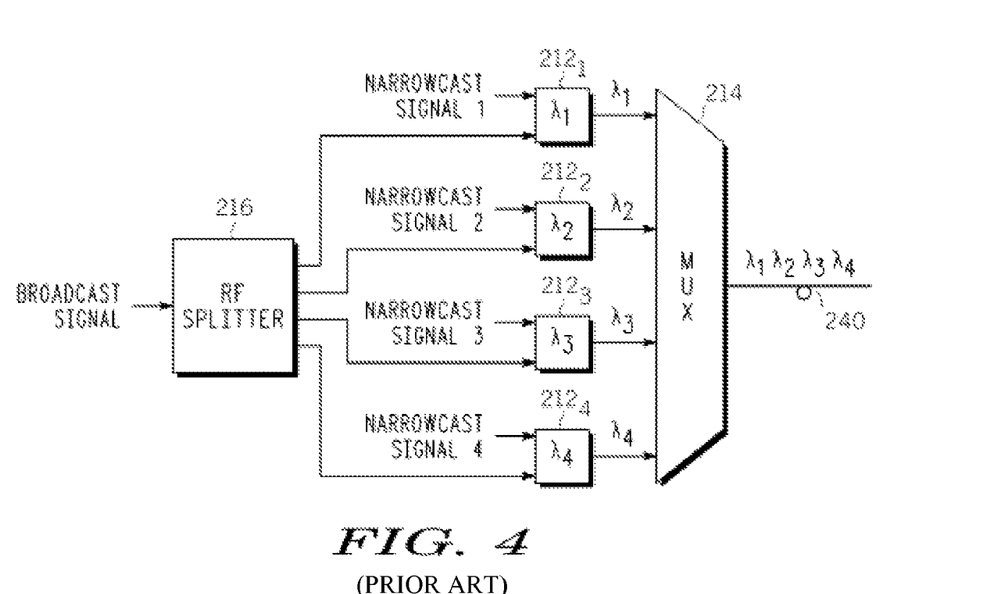
FIG. 4 illustrates a typical WDM system for common broadcast and different narrowcast transmissions in CATV transmission systems.

As illustrated in FIG. 4, narrowcast signals may be RF frequency multiplexed into broadcast channels. The narrowcast signals are typically digital signals and are normally much lower in amplitude than broadcast video signals. The arrangement of sending the same broadcast signal and different narrowcast signals over multiple wavelengths (WDM) is a means of providing more segmentation in an optical network. As illustrated in FIG. 4, an RF splitter 216 splits the broadcast signal among the lasers 2121, 2122, 2123, and 2124. As shown, the lasers 212 each receive a different narrowcast signal. The wavelengths carrying the combined broadcast and individual narrow cast signals, λ1, λ2, λ3 and λ4, respectively, are optically multiplexed onto optical fiber 240.

Although WDM optical transmission systems have increased the speed and capacity of optical networks, the performance of such systems is limited by various factors such as chromatic dispersion and the fiber nonlinearity, which can cause pulse shape change in the case of baseband digital signals and distortions in case of analog signals. These impairments degrade the quality of the optically transmitted information. Fiber nonlinearities, for example, can give rise to crosstalk between optical signals operating at different wavelengths. When crosstalk occurs, modulation components of one signal are superimposed on another signal at a different wavelength. If the level of crosstalk is sufficiently large it will corrupt the information being transmitted by the optical signals impacted by this impairment.

Figure 1:
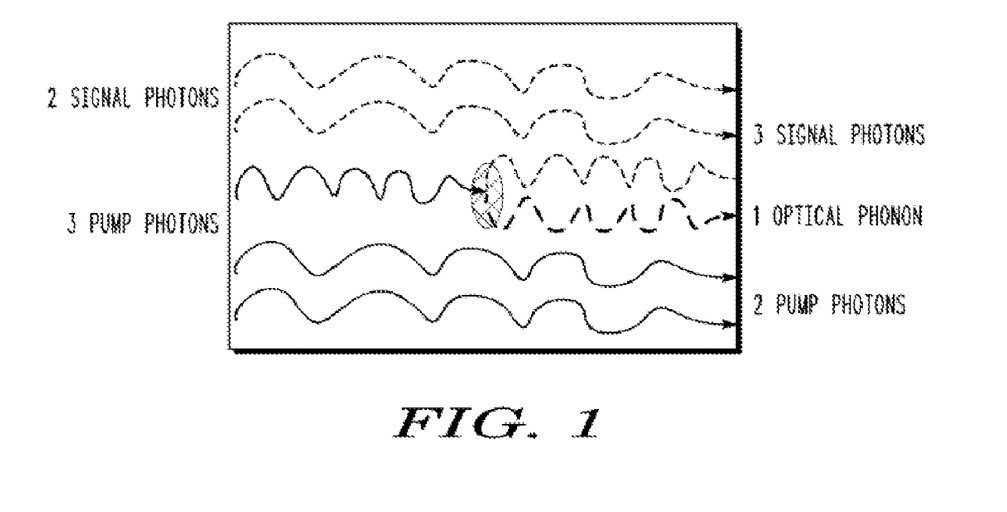
FIG. 1 is a schematic diagram illustrating the stimulated Raman scattering process.

One common cause of crosstalk, in an optical fiber communication system with multiple wavelengths, is Raman scattering. This type of crosstalk is caused by stimulated Raman scattering (SRS) in silica fibers (and other materials) when a pump wave co-propagates with a signal wave through it. Stimulated Raman scattering is an inelastic scattering process in which an incident pump photon loses its energy to create another photon of reduced energy at a lower frequency. The remaining energy is absorbed by the fiber medium in the form of molecular vibrations (i.e. optical phonons) FIG. (1) is a schematic diagram of the stimulated Raman scattering process. FIG. 1 illustrates a pump photon scattering in the Raman media. As a result of the scattering event the pump photon is annihilated and a new signal photon at the Stokes frequency is created along with an optical phonon at the Stokes shift frequency. Both energy and momentum are conserved:

$$\hbar \omega_{pump} = \hbar \omega_{signal} + \hbar \omega_{Op\ phonon} \text{ and } \hbar \vec{K}_{pump} = \hbar \vec{K}_{signal} + \hbar \vec{K}_{Op\ phonon}, \quad (1)$$

where ωx is the frequency of x and kx is the associated wavevector of x and ℏ is Planck's constant divided by 2π.

Figure 2A:
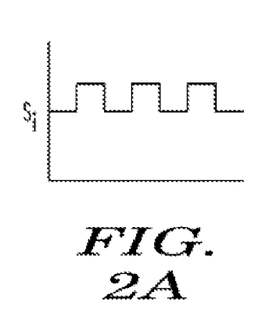
FIGS. 2A and 2B show signals Si and Sj, respectively.
Figure 2B:
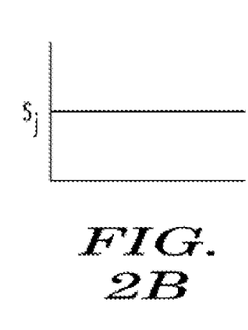
Figure 2C:
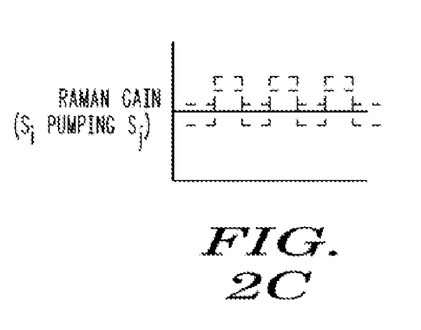
FIG. 2C shows signal Si pumping signal Sj, for the purpose of facilitating an understanding of Raman crosstalk.

FIG. 2 shows how the transfer of energy from Raman gain gives rise to crosstalk. FIG. 2 is a simplified illustration that is useful in facilitating an understanding of Raman crosstalk between two optical channels or signals Si and Sj, where Sj is at a longer wavelength than Si. FIG. 2A shows the signal Si and FIG. 2B shows the signal Sj. For simplicity of illustration Sj is shown as a signal with constant amplitude (i.e. a continuous string of zeros or ones in the case of baseband digital modulation). As indicated in FIG. 2C, the pattern of signal Si (dashed line) is impressed on the signal Sj by the process of Raman amplification. In other words, signal Sj now includes as one of its components the pattern of signal Si. Likewise, since signal Si is pumping the signal Sj, the pattern of signal Sj (had it been modulated) would be impressed upon the pump Si by the process of pump depletion.

In addition to the generation of unwanted crosstalk the SRS process can also lead to the generation of Raman induced second order (CSO: composite second order) and third order (CTB: composite triple beat) distortions. These distortions occur as result of the nonlinear nature of the Raman amplification process which, in the undepleted regime, is exponential in form.

Further, the Raman induced crosstalk and nonlinear distortions are more pronounced when the wavelengths are located near the zero dispersion wavelength of the optical transmission media through which the signals are co-propagating (i.e. the optical fiber). In the case of a near zero dispersion system the optical pump and signal waves are propagating at nearly identical group velocities through the media. The zero dispersion wavelength of a transmission media refers to the wavelength at which an optical signal will have no change in (inverse) group velocity with respect to changes in its optical frequency. The zero dispersion wavelength differs for different transmission media. In this case, the relative positions of the waves with respect to one another will remain nearly fixed throughout the length of the transmission media. Thus, if the signals Si and Sj are at or near the zero dispersion wavelength, they will largely maintain their relative phase with respect to one another. Hence, with very little walk off occurring between the optical channels the Raman induced crosstalk and distortions can build up along the fiber in a constructive manner. The dispersion will generally increase as the wavelength difference between the optical signal and the zero dispersion wavelength increases. If the signals Si and Sj are located at wavelengths far displaced from the zero dispersion wavelength, their relative phases will change as they propagate down the transmission path. The levels of Raman induced crosstalk and distortions are much lower in the non-zero dispersion scenario because, as the signals walk away from one another, it becomes more difficult for the crosstalk and distortions to build up constructively along the fiber length.

With reference again to FIGS. 3 and 4, Raman crosstalk may occur among the optical channels $\lambda 1$, $\lambda 2$, $\lambda 3$ and $\lambda 4$. Raman interactions cause both crosstalk and second order distortions on each optical channel. Because the amplitude of broadcast video signals is much higher than that of narrowcast digital signal, Raman crosstalk has more impact on analog video signals between optical channels than on narrowcast channels. More precisely, the analog signal formats are typically more susceptible to impairment corruption than the digital signal formats.

The widely used optical wavelengths in a typical CATV application, e.g. around 1310 nm, exhibit little relative dispersion between adjacent ITU frequencies, and hence are particularly affected by the SRS effect when used in a WDM system. Moreover, a typical CATV application also uses a single laser to broadcast both the analog broadcast signal and the narrowcast signal. Hence, CATV MSOs have been generally prevented from using a WDM approach to increase bandwidth because of the degradation in the analog signal from Raman interaction. As a result, in order to meet the increased demand for additional bandwidth, CATV MSOs may be required to install more optical fiber to carry additional channels, and then segment their subscriber base between the newly installed optical fiber and the existing fiber. However, this approach requires a significant capital investment for the MSOs and often negotiation of additional access rights to install the optical fiber. Alternatively, the CATV MSOs may use other wavelengths which are less affected by SRS, e.g. 1550 nm. However use of these wavelengths require more expensive optical components, e.g. lasers and nodes, significant changes to their existing optical network and significant capital investment as well.

Accordingly, it is desirable to have a method and apparatus for reducing the levels of Raman induced crosstalk and distortions that arises among the individual channels comprising a WDM optical system. This is particularly true in the case of a system utilizing optical channels that are located near the zero dispersion wavelength of the transmission medium. The method and apparatus described herein utilizes destructive interference amongst coherently related signals. In this case the coherence comes about as result of identical modulation information being imparted upon the various optical carriers in the system.

SUMMARY OF THE INVENTION

In accordance with the principles of the invention, a method of transmitting a WDM optical signal may comprise the step of: modulating a plurality of optical channels that are each located at a different wavelength from one another with a respective one of a plurality of information-bearing broadcast signals that all embody the same broadcast information, at least one of the broadcast signals being out of phase with respect to remaining ones of the plurality of broadcast signals; multiplexing each of the modulated optical channels to form a WDM optical signal; and forwarding the WDM optical signal onto an optical transmission path, wherein the plurality of optical channels is an odd number of optical channels. The method may further comprise applying a phase shift of 180 degrees to the at least one of the plurality of broadcast signals relative to the remaining ones of the plurality of broadcast signals. The method may further comprise applying a phase shift to selected ones of the plurality of broadcast signals so that the optical channels modulated thereby have contributions to Raman crosstalk at a selected one of the optical channels that are diminished by contributions to Raman crosstalk from optical channels that do not undergo a phase shift. In the method, the step of modulating a plurality of optical channels may further include combining a narrowcast signal with each broadcast signal prior to modulating. In the method the wavelengths may be sequential wavelengths. In the method, the optical channels may be located at wavelengths at or near a zero dispersion wavelength of the transmission path.

In accordance with the principles of the invention a WDM optical transmitter may comprise: a plurality of optical sources for generating optical channels located at different wavelengths; a plurality of modulators each having an input for receiving a respective one of a plurality of information-bearing broadcast signals that all embody the same broadcast information, each modulator being associated with a respective one of the plurality of optical sources to thereby provide a plurality of modulated optical channels; a phase shifter for adjusting a phase of at least one of the plurality of broadcast signals so that it is out of phase relative to another of the plurality of broadcast signals; and a multiplexer coupled to the plurality of optical sources to receive and combine the modulated optical channels to produce a multiplexed optical signal, wherein the plurality of optical sources is an odd number of optical sources. In the apparatus of the invention, the phase shifter may be configured to apply a phase shift of 180 degrees to the at least one of the plurality of broadcast signals relative to the remaining ones of the plurality of broadcast signals. In the apparatus the optical channels may be located at wavelengths at or near a zero dispersion wavelength of an optical transmission path into which the optical signal is to be transmitted. The apparatus may further include a phase controlling element, such as a cut length of optical fiber or RF cable, which equalizes the paths of the modulated optical channels so that at least one of the modulated optical channels is out of phase with respect to the remaining modulated optical channels on the optical fiber. In the apparatus, the plurality of modulator may include modulators which directly or externally modulate a laser transmitter with the broadcast signals and narrowcast signals on an optical channel.

A method and apparatus is provided for transmitting a WDM optical signal. The method begins by modulating a plurality of optical channels that are each located at a different wavelength from one another. For optimal performance of the Raman distortion destructive interference method the plurality of optical channels should constitute an odd number (i.e. 3, 5, 7 . . . etc.). Each of the plurality of optical channels (ideally an odd number) is modulated with a respective one of a plurality of information-bearing broadcast signals that all embody the same broadcast information. The plurality of information bearing broadcast signals is prepared in a manner such that their phases alternate between 0 and 180 degrees (i.e. 0 and π radians) with respect to one another prior to being applied as modulation to the odd plurality of optical channels. Furthermore, each of the odd plurality of optical channels may have imparted upon them an additional information bearing modulation that is unique and specific to each optical channel. The narrowcast modulation on any one of the optical channels is generally uncorrelated with the narrowcast modulation information being transmitted any of the other optical channels in the system. Each of the plurality of modulated optical channels is then multiplexed to form a WDM optical signal.

The optical signal paths starting from the individual outputs of the odd plurality of optical channel sources (lasers) to the output of the optical multiplexing device (multiplexer) are constructed in a manner so as not to impart any additional relative phase shifts upon the plurality of modulating broadcast signals. The WDM optical signal is forwarded onto an optical transmission path.

DETAILED DESCRIPTION

The present invention describes an arrangement which allows an MSO to increase the bandwidth of an optical network by enabling use of a WDM system. The method and apparatus described herein utilizes destructive interference among coherently related signals. In this case the coherence comes about as result of identical modulation information being imparted upon the various optical carriers in the system.

A discussion of reducing Raman crosstalk is provided in commonly assigned by the same inventors U.S. Ser. No. 11/612,832 filed on Dec. 19, 2006 titled METHOD AND APPARATUS FOR REDUCING CROSSTALK AND NON-LINEAR DISTORTIONS INDUCED BY RAMAN INTERACTIONS IN A WAVELENGTH DIVISION MULTIPLEXED (WDM) OPTICAL COMMUNICATION SYSTEM, incorporated herein by reference in its entirety.

The present inventors have recognized that the Raman induced interference and CSO problems can be overcome in a simple approach by transmitting an odd number of optical channels in a manner which introduces destructive interference into the Raman induced impairments from the other channels. More particularly, the present invention enables adjusting the phases of the separate channels with respect to one another. Specifically, Raman crosstalk and the induced CSO distortions can be reduced by alternating the phase of the signals by 180 degrees with respect to others of the signals. The following guidelines and examples that are discussed in connection with wavelengths $\lambda 1$-$\lambda 5$ are presented by way of illustration only and should not be construed as a limitation on the invention.

Figure 5:
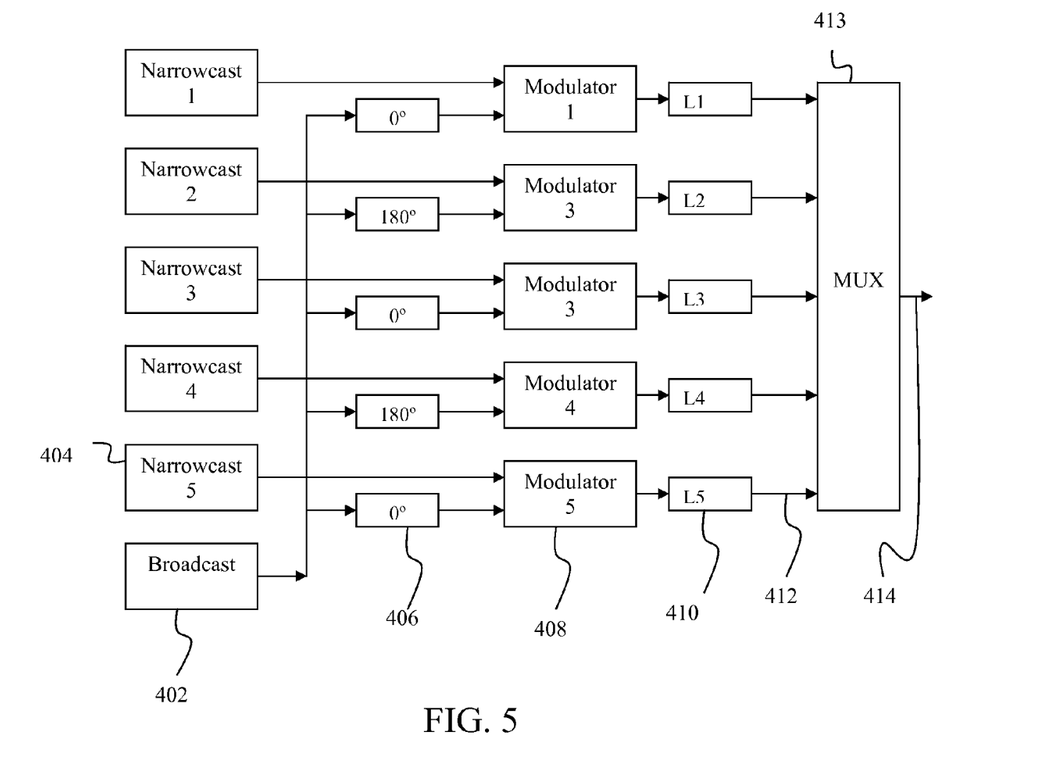
FIG. 5 illustrates an exemplary WDM system in accordance with the invention.

FIG. 5 illustrates an exemplary arrangement for a transmission system in accordance with the principles of the invention. As illustrated in FIG. 5, an odd number of laser transmitters 412, e.g. 3, 5, 7 etc. are used. In an exemplary implementation, a RF broadcast signal is received at broadcast signal unit 402 and RF narrow cast signals are received at narrow cast signal units 404. Those of skill in the art will appreciate that broadcast signal unit 402 and narrowcast signal unit 404 are merely illustrated as separate units for discussion purposes and may take on any suitable form. The broadcast signal is split and provided to RF phase delay units 4061-5, which are associated with each respective channel, e.g. $\lambda 1$-$\lambda 5$ provide a phase of 180 degrees or zero degrees to each broadcast signal. More particularly, the phase of 180 degrees may be provided to every other broadcast signal, e.g. to the odd numbered channels. In this manner, each of the adjacent channels preferably have a 180 degrees phase shift. Alternatively, the phase shift may be provided to the even number of channels. Those of skill will appreciate that the phase shift can be achieved through a variety other techniques, such as modulating external modulators, which are biased at different operational points, with the split in-phase broadcast signals, an amplification stage, etc.

Each of the RF broadcast signals and an associated RF narrow cast signals are provided to one of the RF modulators 4081-5. The modulators 4081-5, in turn, drive lasers 4101-5 to produce channels 1-5 at wavelengths $\lambda 1$-$\lambda 5$, respectively. In a preferred implementation, the lasers 410 are selected to transmit at sequential wavelengths in the ITU standard, e.g. 1270 nm, 1290 nm, 1310 nm, 1330 nm, 1350, etc. By using sequential wavelengths (e.g. sequential optical channels), the relative dispersion between the optical channels (e.g. between $\lambda 1$-$\lambda 2$) is at a minimum, and hence the destructive interference of the induced Raman gain is at a maximum by virtue of their respective 180 degree phase difference. However, those of skill in the art will appreciate that non-sequential wavelengths may also be used so long as a sufficient amount of Raman induced interference is removed. In a preferred implementation, the wavelengths may also be at or near a zero dispersion wavelength of the transmission path. However, the wavelengths may also be closely spaced at a nonzero dispersion wavelength of the transmission path.

The lasers 410 transmit through a corresponding optical fiber 412, respectively, to an optical multiplexer 413 which multiplexes $\lambda 1$-$\lambda 5$ onto optical fiber 414. In a preferred implementation, optical multiplexer 413 is a phase balanced multiplexer and optical fibers 412 are made of appropriate respective lengths so that optical phase between the adjacent channels is (e.g. remains) 180 degrees when they are on optical fiber 414.

In a preferred implementation, the launch power (or amplitude) of the optical channels is substantially equal. However, an amplitude adjuster may be provided for adjusting the relative amplitudes of each laser (i.e. the optical signal output level generated by each of the lasers), or the optical modulation index of each laser. In addition, while FIG. 5 shows a modulator block separate from the laser block, those of skill in the art will appreciate that this arrangement is only for discussion purposes and that a directly modulated laser (DM) typically includes a modulation process internal to the laser which imposes the modulation on the formed optical wave emitted. Those of skill in the art will also appreciate that the techniques described herein can be applied to external modulators as well, in which the optical wave is typically modulated after being emitted form the laser.

The following equations explain the process of eliminating the undesired Raman induced crosstalk and CSO distortions (collectively referred to as Raman induced impairments) utilizing the destructive interference. Under consideration here is the elimination of the deleterious Raman interaction effects upon the common broadcast information that is imparted on every optical signal in the system. The modulating information is represented by $f_i(t)$ and $f_j(t)$ in (2b). These modulation terms can be further decomposed into a common broadcast component and unique narrowcast components.

For explanation purposes, the signal wave power ($P_i$) of an optical wave in a system with multiple transmitters is given by the following equation, CSO is the composite second order; CTB is the composite triple beat; L is the length of fiber; G is the Raman gain coefficient; $L_{eff}$ is the effective length in the fiber at the pump wavelength, $\alpha$ is the power attenuation factor in the fiber at the signal wavelength, $\bar{\rho}_L$ is the running average probability of finding the two signals in the same state of polarization, $\tilde{n}_i$ and $\tilde{n}_j$ are the indices of refraction at the respective wavelengths, $G_{i,j}$ is the absolute Raman gain. By defining a simple function Hs,p as:

$$H_{i,j} \equiv \begin{cases} 1 & \lambda_i > \lambda_j \\ -1\frac{\tilde{n}_j \lambda_j}{\tilde{n}_i \lambda_i} & \lambda_i < \lambda_j \end{cases} \quad (2)$$

$$P_i(t, L) = P_{0i}\left(1 + L_{eff}\sum_{j=1}^{n} H_{i,j}G_{i,j}\bar{\rho}_{Li,j}P_{0j}\right) \quad (2a)$$

$$e^{-\alpha L} + \left[P_{0i}m_i f_i(t)\left(1 + L_{eff}\sum_{j=1}^{n} H_{i,j}G_{i,j}\bar{\rho}_{Li,j}P_{0j}\right) + \right.$$

$$\left. P_{0i}L_{eff}\sum_{j=1}^{n} H_{i,j}P_{0j}m_j f_j(t)G_{i,j}\bar{\rho}_{Li,j}\right]$$

$$e^{-\alpha L}\left[CSO_i\left(1 + L_{eff}\sum_{j=1}^{n} H_{i,j}G_{i,j}\bar{\rho}_{Li,j}P_{0j}\right) + \right.$$

$$\left. P_{0i}L_{eff}\sum_{j=1}^{n} H_{i,j}G_{i,j}\bar{\rho}_{Li,j}CSO_j + \right.$$

$$\left. P_{0i}m_i f_i(t)L_{eff}\sum_{j=1}^{n} H_{i,j}G_{i,j}\rho_{Li,j}P_{0j}m_j f_j(t)\right]$$

$$e^{-\alpha L}\left[CTB_i\left(1 + L_{eff}\sum_{j=1}^{n} H_{i,j}G_{i,j}\bar{\rho}_{Li,j}P_{0j}\right) + \right.$$

$$\left. P_{0i}L_{eff}\sum_{j=1}^{n} H_{i,j}G_{i,j}\rho_{Li,j}CTB_j + \right.$$

$$\left. P_{0i}m_i f_i \frac{(L_{eff})^2}{2}\left[\sum_{j=1}^{n} H_{i,j}G_{i,j}\rho_{Li,j}P_{0j}m_j f_j(t)\right]^2\right]e^{-\alpha L}$$

The summations in (2a) are over the parameters of the "n" transmitters in the system. It is important to note that the above equations are to be interpreted as being in the optical domain. Therefore the powers in these equations, including the distortions (CSOi, CSOj, CTBi, and CTBj) are optical powers and not electrical (or RF) power levels.

It is the specific purpose of this invention to eliminate through the use of destructive interference the deleterious effects of the Raman induced RF subcarrier crosstalk and CSO distortions. These are respectively represented by the second term in the second line of (2a) and the third term in the third line of (2a). That is, we seek solutions to the following equations along with the method and apparatus to physically realize the solutions:

$$0 = P_{0i}L_{eff}\sum_{j=1}^{n} H_{i,j}P_{0j}m_j f_j(t)G_{i,j}\bar{\rho}_{Li,j} \quad (2b)$$

$$0 = P_{0i}m_i f_i(t)L_{eff}\sum_{j=1}^{n} H_{i,j}G_{i,j}\bar{\rho}_{Li,j}P_{0j}m_j f_j(t)$$

$$f_i(t) = f_{BC}(t) + f_{NCi}(t) \quad (3a)$$
$$f_j(t) = f_{BC}(t) + f_{NCj}(t)$$

In (3a) $f_{BC}(t)$ represents the common broadcast information imparted upon all of the optical signals. Since the broadcast information is identical on all of the optical signals it does not depend upon the particular signal and hence has no indices associated with it. The broadcast information is highly correlated from one optical signal to any other. The broadcast information represents the coherent portion of the modulating information with respect to correlations from one optical signal to any other optical signal in the system.

The terms $f_{NCi}(t)$ and $f_{NCj}(t)$ represent unique narrowcast information modulating either the ith or jth optical transmitters respectively, in general these terms are not equal to one another and have no correlation to one another. The narrowcast information represents the incoherent portion of the modulating information with respect to correlations from one optical signal to any other optical signal in the system.

In the preferred implementation a phase shift $\theta_i$ can be imposed onto the composite broadcast modulation applied to the ith transmitter and a phase shift $\theta'_i$ can be imposed upon the composite narrowcast modulation applied to the ith transmitter. These phase shifts can be accomplished by means of a broadband phase shifter such as a transformer based all pass filter that has a constant phase shift across the modulation frequency band of interest. The composite modulation signals feeding each transmitter may be run though broadband phase shifters specifically tailored for each laser with a specified phase.

With such phase shifts applied (3a) becomes:

$$f_i(t, \theta_i, \theta'_i) = f_{BC}(t, \theta_i) + f_{NCi}(t, \theta'_i)$$

$$f_j(t, \theta_j, \theta'_j) = f_{BC}(t, \theta_j) + f_{NCj}(t, \theta'_j) \quad (3b)$$

Substituting (3b) into (2b):

$$0 = P_{0i}L_{eff}\left[\sum_{j=1}^{n} H_{i,j}P_{0j}m_j G_{i,j}\bar{\rho}_{Li,j}f_{BC}(t, \theta_j) + \right. \quad (4)$$

$$\left. \sum_{j=1}^{n} H_{i,j}P_{0j}m_j G_{i,j}\bar{\rho}_{Li,j}f_{NCj}(t, \theta'_j)\right]$$

$$0 = P_{0i}m_i[f_{BC}(t, \theta_i) + f_{NCi}(t, \theta'_{j_i})]$$

-continued $$L_{eff}\left[\sum_{j=1}^{n}H_{i,j}P_{0j}m_{j}G_{i,j}\overline{\rho}_{Li,j}f_{BC}(t,\theta_{j})+\right.$$

$$\left.\sum_{j=1}^{n}H_{i,j}P_{0j}m_{j}G_{i,j}\overline{\rho}_{Li,j}f_{NCj}(t,\theta'_{j})\right]$$

Dividing out the common terms in (4) leaves:

$$0 = \tag{5a}$$

$$\sum_{j=1}^{n}H_{i,j}P_{0j}m_{j}G_{i,j}\overline{\rho}_{Li,j}f_{BC}(t,\theta_{j})+\sum_{j=1}^{n}H_{i,j}P_{0j}m_{j}G_{i,j}\overline{\rho}_{Li,j}f_{NCj}(t,\theta'_{j})$$

$$0 = \sum_{j=1}^{n}H_{i,j}P_{0j}m_{j}G_{i,j}\overline{\rho}_{Li,j}f_{BC}(t,\theta_{j})+\sum_{j=1}^{n}H_{i,j}P_{0j}m_{j}G_{i,j}\overline{\rho}_{Li,j}f_{NCj}(t,\theta'_{j})$$

Both lines of (5a) are identical meaning that the methodology employed to eliminate the Raman induced crosstalk will also eliminate the Raman induced CSO distortions. We need now only be concerned with one line in (5a):

$$0 = \sum_{j=1}^{n}H_{i,j}P_{0j}m_{BCj}G_{i,j}\overline{\rho}_{Li,j}f_{BC}(t,\theta_{j})+ \tag{5b}$$

$$\sum_{j=1}^{n}H_{i,j}P_{0j}m_{NCj}G_{i,j}\overline{\rho}_{Li,j}f_{NCj}(t,\theta'_{j})$$

The first summation in (5b) represents the coherent broadcast components of the optical signals' modulations and the second summation represents the incoherent narrowcast components of the optical signal's modulations. Also in recognition of the fact that the broadcast and narrowcast optical modulation indices may be different, the OMI's in the two summations are now distinguished respectively as $m_{BC\,j}$ and $m_{NC\,j}$. Taking the Fourier transform of (5b) gives the frequency domain representation of the equation:

$$0 = F_{BC}(\omega)\sum_{j=1}^{n}H_{i,j}P_{0j}m_{BCj}G_{i,j}\overline{\rho}_{Li,j}e^{(i\theta_{j})}+ \tag{6}$$

$$\sum_{j=1}^{n}H_{i,j}P_{0j}m_{NCj}G_{i,j}\overline{\rho}_{Li,j}F_{NCj}(\omega)e^{(i\theta'_{j})}$$

Where $F_{BC}(\omega)$ and $F_{NC\,j}(\omega)$ are the respective frequency domain representations of the broadcast and narrowcast modulating information. In all cases the frequency spectrum occupied by the broadcast modulation is different from and exclusive of the frequency spectrum occupied by the narrowcast modulation information therefore each summation in (6) can separately be set to zero giving:

$$0 = \sum_{j=1}^{n}H_{i,j}G_{i,j}\overline{\rho}_{Li,j}P_{0j}m_{BCj}e^{(i\theta_{j})} \tag{7}$$

$$0 = \sum_{j=1}^{n}H_{i,j}G_{i,j}\overline{\rho}_{Li,j}F_{NCj}(\omega)P_{0j}m_{NCj}e^{(i\theta'_{j})}$$

The first equation in (7) is the equation that describes the elimination of the Raman induced crosstalk and CSO on the coherent broadcast signals. The second equation relates to elimination of the Raman induced crosstalk and CSO on the incoherent narrowcast signal. However, those of skill in the art will appreciate that the incoherent narrowcast information is typically a digital format modulation such as quadrature amplitude modulation (QAM) which is more robust in the face of Raman induced crosstalk and CSO. Hence, as the narrowcast signals are already relatively resistant to degradation from Raman induced crosstalk and CSO, reducing the Raman induced crosstalk and CSO in the broadcast signals provides the most benefit. Therefore, in the remainder of this application the focus will be on explaining the conditions that eliminate the Raman induced distortions on the coherent broadcast modulation spectrum.

The coherent broadcast spectrum may consist of analog modulation (intensity modulation) and/or digital type modulation (QAM). The important quality is that the exact same broadcast modulation information is imparted upon every optical signal in the system.

Placing the criteria for eliminating the Raman induced crosstalk and CSO falling within the broadcast modulation spectrum in matrix form, we have, from the first line of equation 7:

$$0 = \begin{bmatrix} 0 & R_{12} & R_{13} & \cdots & R_{1n} \\ R_{2,1} & 0 & R_{23} & \cdots & R_{2n} \\ R_{3,1} & R_{3,2} & 0 & \cdots & R_{3n} \\ \vdots & \vdots & \vdots & \ddots & \vdots \\ R_{n,1} & R_{n,2} & R_{n,3} & \cdots & 0 \end{bmatrix}_{n \times n} \begin{bmatrix} e^{(i\theta_1)}m_{BC1}P_{01} \\ e^{(i\theta_2)}m_{BC2}P_{02} \\ e^{(i\theta_3)}m_{BC3}P_{03} \\ \vdots \\ e^{(i\theta_n)}m_{BCn}P_{0n} \end{bmatrix}_{1 \times n} \tag{8}$$

Suppose that the optical wavelengths are arranged such that $\lambda_1 < \lambda_2 \ldots < \lambda_{n-1} < \lambda_n$ then the matrix can be written as:

$$\begin{bmatrix} 0 \\ 0 \\ 0 \\ \vdots \\ 0 \end{bmatrix} = \begin{bmatrix} 0 & -\varepsilon_{1,2}r_{2,1} & -\varepsilon_{1,3}r_{3,1} & \cdots & -\varepsilon_{1,n}r_{n,1} \\ r_{2,1} & 0 & -\varepsilon_{2,3}r_{3,2} & \cdots & -\varepsilon_{2,n}r_{n,2} \\ r_{3,1} & r_{3,2} & 0 & \cdots & -\varepsilon_{3,n}r_{n,3} \\ \vdots & \vdots & \vdots & \ddots & \vdots \\ r_{n,1} & r_{n,2} & r_{n,3} & \cdots & 0 \end{bmatrix} \begin{bmatrix} e^{(i\theta_1)}m_{BC1}P_{01} \\ e^{(i\theta_2)}m_{BC2}P_{02} \\ e^{(i\theta_3)}m_{BC3}P_{03} \\ \vdots \\ e^{(i\theta_n)}m_{BCn}P_{0n} \end{bmatrix} \tag{9}$$

Where the Raman interaction matrix elements are written as $$r_{i,j} \equiv G_{i,j}\overline{\rho}_{Li,j} \text{ and } \varepsilon_{i,j} \equiv \frac{\tilde{n}_j\lambda_j}{\tilde{n}_i\lambda_i} \approx 1 \tag{10}$$

To understand the basic principle of operation of the Raman distortion destructive interference method consider the simplified case in which all of the launch powers are equal to one another, all of the broadcast OMI's are equal to one another, and the $\varepsilon_{i,j}$ factors are taken to be unity. With these simplifications (9) reduces to:

$$\begin{bmatrix} 0 \\ 0 \\ 0 \\ \vdots \\ 0 \end{bmatrix} = \begin{bmatrix} 0 & -r_{2,1} & -r_{3,1} & \cdots & -r_{n,1} \\ r_{2,1} & 0 & -r_{3,2} & \cdots & -r_{n,2} \\ r_{3,1} & r_{3,2} & 0 & \cdots & -r_{n,3} \\ \vdots & \vdots & \vdots & \ddots & \vdots \\ r_{n,1} & r_{n,2} & r_{n,3} & \cdots & 0 \end{bmatrix} \begin{bmatrix} e^{(i\theta_1)} \\ e^{(i\theta_2)} \\ e^{(i\theta_3)} \\ \vdots \\ e^{(i\theta_n)} \end{bmatrix} \quad (11)$$

We may further simplify (11) by making the ideal assumption, (which is only appropriate for illustrative purposes) that all of the $r_{i,j}$ have the same magnitude. With this great simplification (11) reduces to:

$$\begin{bmatrix} 0 \\ 0 \\ 0 \\ \vdots \\ 0 \end{bmatrix} = \begin{bmatrix} 0 & -1 & -1 & \cdots & -1 \\ 1 & 0 & -1 & \cdots & -1 \\ 1 & 1 & 0 & \cdots & -1 \\ \vdots & \vdots & \vdots & \ddots & \vdots \\ 1 & 1 & 1 & \cdots & 0 \end{bmatrix} \begin{bmatrix} e^{(i\theta_1)} \\ e^{(i\theta_2)} \\ e^{(i\theta_3)} \\ \vdots \\ e^{(i\theta_n)} \end{bmatrix} \quad (12)$$

Taking note of the following: the magnitudes of the complex phase exponentials are all unity, for a system with n optical signals there are n−1 nonzero elements in every row of the n×n Raman crosstalk interaction matrix. Therefore, in a system using these assumptions, by making n odd so that n−1 is even the contributions of every signal in every row of (12) can be cancelled out in pairs. We may also arrange the system so that the terms in the last row cancel out in pairs by assigning alternating phases as follows to the n (odd) wavelengths of the system:

$$\theta_1 = \theta_1, \theta_2 = \theta_1 + 180, \theta_3 = \theta_1 \ldots \theta_{n-1} = \theta_1 + 180, \theta_n = \theta_1 \quad (13a)$$

The preferred implementation, and perhaps the simplest scheme, is to let $\theta_1 = 0$ then the phases assigned to the n wavelengths alternate between 0 and 180 degrees (π radians):

$$0_1, 180_2, 0_3, 180_4, 0_5, 180_6, \ldots, 0_n \quad (13b)$$

If the simplified system (12) is restricted to have an odd number of wavelengths, then each row of the n×n Raman crosstalk interaction matrix contains an even number of nonzero elements and if the phases are arranged as in (13b) every equation represented by (12) reduces to the summation of an alternating series of +1 and −1 which adds exactly to zero.

$$\begin{bmatrix} 0 \\ 0 \\ 0 \\ \vdots \\ 0 \end{bmatrix} = \begin{bmatrix} 0 & -1 & -1 & \cdots & -1 \\ 1 & 0 & -1 & \cdots & -1 \\ 1 & 1 & 0 & \cdots & -1 \\ \vdots & \vdots & \vdots & \ddots & \vdots \\ 1 & 1 & 1 & \cdots & 0 \end{bmatrix} \begin{bmatrix} 1 \\ -1 \\ 1 \\ \vdots \\ 1 \end{bmatrix}_{n\,ODD} \quad (14)$$

In a particular implementation of the invention, which may be represented by equation (9), the various terms in the n×n Raman crosstalk interaction matrix may not all be unity nor have equal magnitudes. However we may balance the overall inequities in each equation represented in (9) by adjusting the launch power levels, OMI values, and phase settings for each optical signal in the system so that every equation results in a zero net sum. Hence, the Raman induced crosstalk and CSO in the broadcast modulation spectra is nevertheless minimized, if not totally eliminated, on every wavelength in the system.

Figure 6A:
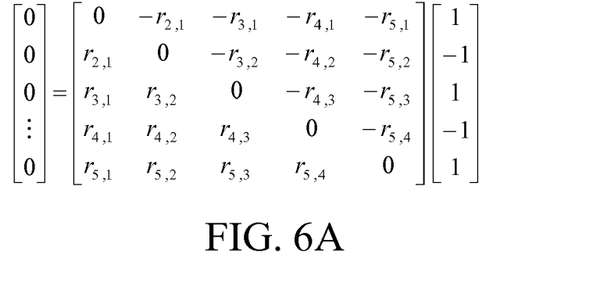
FIG. 6 illustrates interaction of Raman induced interference using an odd number of wavelengths in accordance with the present invention.
Figure 6B:
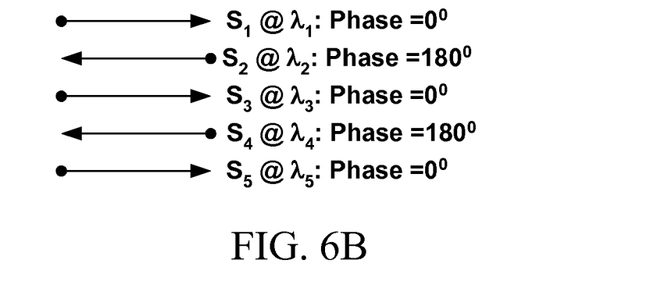
Figure 6C:
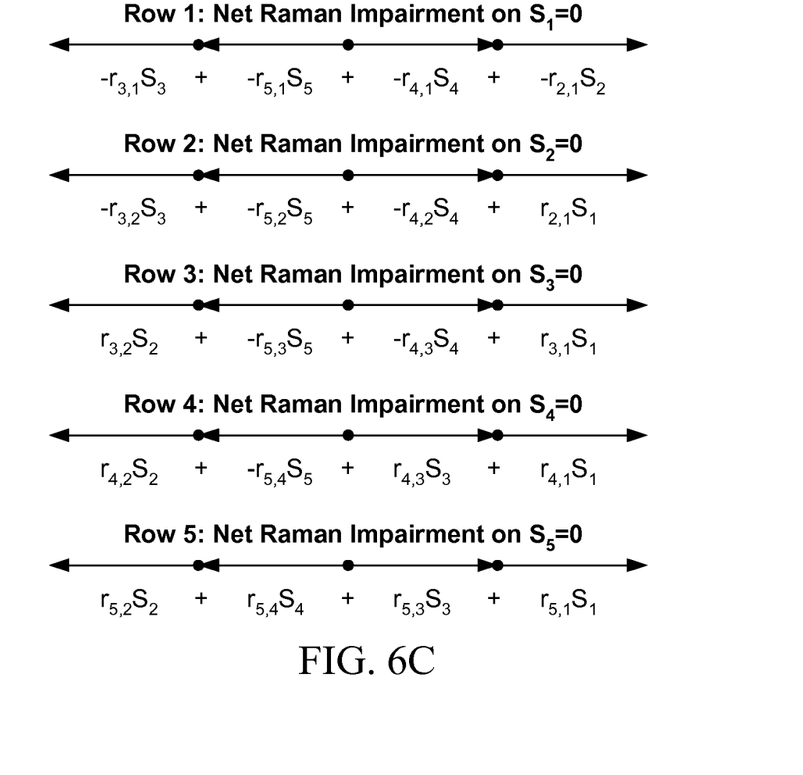

FIGS. 6A-C show an illustrative example based on the simplified system of equations given by (14) in which all of the launch powers are equal to one another, all of the broadcast OMI's are equal to one another, and the $\epsilon_{i,j}$ factors are taken to be unity. Furthermore, the alternating phase arrangement of (13b) is applied to the system. We are therefore working with the following system of equations:

$$\begin{bmatrix} 0 \\ 0 \\ 0 \\ 0 \\ 0 \end{bmatrix} = \begin{bmatrix} 0 & -r_{2,1} & -r_{3,1} & -r_{4,1} & -r_{5,1} \\ r_{2,1} & 0 & -r_{3,2} & -r_{4,2} & -r_{5,2} \\ r_{3,1} & r_{3,2} & 0 & -r_{4,3} & -r_{5,3} \\ r_{4,1} & r_{4,2} & r_{4,3} & 0 & -r_{5,4} \\ r_{5,1} & r_{5,2} & r_{5,3} & r_{5,4} & 0 \end{bmatrix} \begin{bmatrix} 1 \\ -1 \\ 1 \\ -1 \\ 1 \end{bmatrix} \quad (15)$$

The signals S1, S3, and S5, are of equal magnitude and phase 0 degrees. The signals S4 and S5 have the same magnitude as S1, S3, and S5 but are selected to be 180 degrees out of phase with respect to these three signals. The signals are represented, for simplicity, by vectors along the real axis of a complex plane Argand diagram. FIG. 6A reproduces (15) for clarity. FIG. 6B shows the relative (phase) orientation of the five signals with respect to one another. FIG. 6C diagrammatically illustrates how the signals interact with one another through the Raman process that is described by the 5×5 Raman interaction matrix and equation (8).

In every case, due to the phase and magnitude adjustments implemented by this invention, four interacting signals which ordinarily affect the Raman impairments imparted upon the fifth signal (represented by the row equations in each line of (15)) destructively interfere with one another to produce a zero net sum Raman impairment on the fifth signal. In this manner the Raman impairments are either eliminated or substantially reduced from the common (coherent) broadcast modulation being transmitted on every wavelength in the system. It should also be noted that the technique as explained above can be use in both CWDM and DWDM and therefore generally in any WDW.

Also note, that in this example, had there been four or six total optical signals used instead of five total wavelengths then, in turn, either three or five wavelengths would have been interacting with one another by means of the Raman process to create impairments on the fourth or sixth wavelengths in each row of the corresponding matrix equations. With an odd number of interacting wavelengths, it should be clear by extrapolation of FIG. 6C, that complete cancellation would not be so easily accomplished as one orphaned signal in every row equation would remain un-cancelled and available to produce Raman generated impairments. So here again it is shown that using an odd total number of wavelengths results in an even number of interacting wavelengths which can be cancelled out in pairs to eliminate the Raman impairments. An odd total number of wavelengths is required for optimal cancellation of the Raman impairments on every signal in the system. Accordingly, the Raman induced impairments may be removed or substantially reduced by use the herein described simple and low cost technique of using an odd number of wavelengths in conjunction with alternating phasing of the modulated optical signals without use of other optical parameter adjustment techniques, such as polarization alignment, OMI adjustment, and power adjustment. However, those of skill in the art will appreciate that in certain implementations the removal of Raman induced impairments may be further optimized by performing one or more of the other optical parameter adjustment techniques as well.

As previously mentioned, Raman induced impairments can be particularly acute when the channels are located at wavelengths near the zero dispersion wavelength of the transmission medium because the optical channels largely maintain their relative phases at these wavelengths. For the same reason, the aforementioned technique in which some of the channels are arranged to be out of phase with respect to other channels will be most effective when the channels are located near the zero dispersion wavelength of the transmission path. For instance, for channels operating in the 1310 nm window (typically defined as the waveband between about 1270 nm and 1350 nm), a commonly employed single mode optical fiber is the SMF-28TM fiber, available from Corning, Incorporated. The SMF-28 fiber has a zero dispersion wavelength at or near 1310 nm. Accordingly, if this transmission fiber is employed, Raman crosstalk can be most effectively reduced for optical channels having wavelengths in the vicinity of 1310 nm. Similarly, for optical wavelengths operating in the C-band (wavelengths between about 1525 to 1565 nm), a commonly available optical fiber is Corning's Leaf™ fiber, which has a zero dispersion wavelength near 1500 nm. For the Leaf™ fiber, the Raman crosstalk can be more effectively reduced for channels having wavelengths in the vicinity of 1500 nm than for channels in the vicinity of 1525 nm or 1565 nm. If, on the other hand, the optical wavelengths operate in the L-band (wavelengths between about 1565 to 1625 nm), a commonly available optical fiber is Corning's Leaf.® fiber, which has a zero dispersion wavelength near 1590 nm. For the Leaf.® fiber, the Raman crosstalk can be more effectively reduced for channels having wavelengths in the vicinity of 1590 nm than for channels in the vicinity of 1565 nm or 1625 nm. In the case where optical wavelengths in a WDM system are remote from the zero dispersion wavelength, closer wavelength spacing between WDM channels may be required or link length may be limited in order to maintain the relative phase between channels and therefore the effectiveness of this technique.

Figure 7:
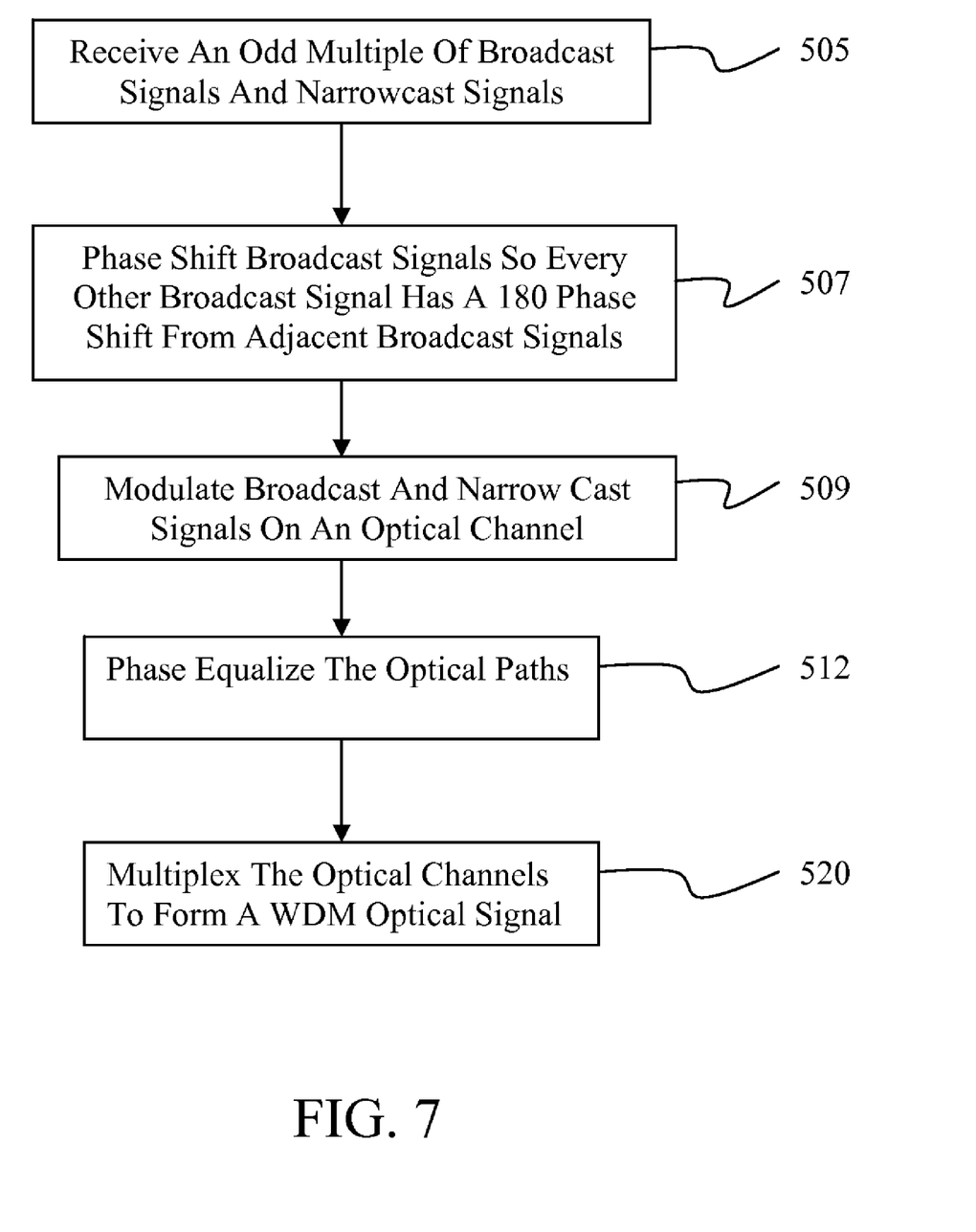
FIG. 7 is a flowchart showing one example of the method performed by the transmitter arrangement depicted in FIG. 5.

FIG. 7 is a flowchart showing one example of the method performed by the transmitter arrangement depicted in FIG. 5. The method begins in step 505 by receiving multiple information-bearing electrical signals that all embody the same broadcast information. The electrical signals may, for example, embody audio and/or video broadcast programming, and may be analog or digital modulation formats, hereafter collectively referred to as "broadcast signals". Next, in step 507, the broadcast signals are phase shifted so that every other broadcast signal has a 180 degree phase shift from the its adjacent broadcast signals, e.g. each odd broadcast signal is phase shifted by 180 degrees. The broadcast signals, along with narrowcast signals, are modulated onto an optical channel, in step 509. Those of skill in the art will appreciate that the signals may be modulated on the optical channel by a direct modulation technique in which the laser source is modulated to impose the signals on the laser produced. Alternatively, an external modulation technique may be used in which the laser produced is modulated external to the laser source, i.e. after the optical channel is produced by the laser source. In either form of modulation, the phase of the optical channels are preferably further controlled in step 512 to ensure that the optical channels retain their respective phase shifts assigned in step 507 so that every other optical channel has a 180 degree phase shift from its adjacent optical channel when they are combined on the same optical fiber. Also in the preferred implementation, the wavelengths of the optical channels are sequential wavelengths in the ITU grid or in some other specified wavelength arrangement, such as from shortest to longest wavelengths. The optical channels are multiplexed on the same fiber in step 520, preferably using a phase balanced multiplexer, to form a WDM optical signal. Those of skill in the art will appreciate that the system may use any suitable multiplexing technique including CWDM and DWDM.

In addition to reducing crosstalk that arises from Raman interactions, the methods and techniques described herein can also mitigate and even eliminate the affects of distortion that arise from Raman interactions, particularly second order distortion, which is known to be especially serious for analog signals. While analog channels are most vulnerable to such distortion, digital channels are also impacted and thus the methods and techniques described herein can reduce Raman distortion arising in both analog and digital signals.

The transmitter arrangement described above can be advantageously used in any optical network in which a broadcast signal is multiplexed onto multiple optical wavelengths or channels. Such networks include, without limitation, various all-optical networks, hybrid fiber-coax (HFC) networks and networks utilizing a passive architecture, which are often referred to as Passive Optical Networks (PONs). In typical HFC architectures, broadcast signal is split at optical hubs and then sent to different nodes together with narrowcast signals.

A method and apparatus have been described for reducing Raman induced crosstalk and distortion that arises among individual channels of a WDM optical signal, which are particularly severe among channels that are located near the zero dispersion wavelength of the transmission medium. The method and apparatus are particularly suitable when the individual channels support broadcast signals carrying the same information, which are sometimes transmitted over a transmission network such as an HFC or PON network.

The invention claimed is:

1. A method of transmitting a WDM optical signal comprising the steps of:
modulating a plurality of optical channels that are each located at a different wavelength from one another with a respective one of a plurality of information-bearing broadcast signals that all embody the same broadcast information, at least one of the broadcast signals being out of phase with respect to remaining ones of the plurality of broadcast signals;
multiplexing each of the modulated optical channels to form a WDM optical signal; and
forwarding the WDM optical signal onto an optical transmission path,
wherein the plurality of optical channels is an odd number of optical channels.

2. The method of claim 1, further comprising applying a phase shift of 180 degrees to said at least one of the plurality of broadcast signals relative to the remaining ones of the plurality of broadcast signals.

3. The method of claim 1, further comprising applying a phase shift to selected ones of the plurality of broadcast signals so that the optical channels modulated thereby have contributions to Raman induced impairments at a selected one of the optical channels that are diminished by contributions to Raman induced impairments from optical channels that do not undergo a phase shift.

4. The method of claim 1, wherein the step of modulating a plurality of optical channels further includes combining a narrowcast signal with each broadcast signal prior to modulating.

5. The method of claim 1, wherein the Raman induced impairments are reduced without use of other optical parameter adjustment techniques.

6. The method of claim 1, wherein the modulating further comprises:
- phase shifting of at least one of a plurality of broadcast signals that all embody the same information, wherein the phase shifted broadcast signal(s) and remaining non-phase shifted signals modulate optical channels at different optical wavelengths, respectively, such that Raman crosstalk and distortions are reduced at a optical channel that is predetermined at a optical wavelength.

7. The method of claim 1, wherein the wavelengths are sequential wavelengths.

8. The method of claim 1, further comprising equalizing the optical paths of the modulated optical channels so that at least one of the modulated optical channels is out of phase with respect to the remaining modulated optical channels.

9. The method of claim 1, wherein the step of modulating a plurality of optical channels includes directly modulating a laser transmitter with the broadcast signals and narrowcast signals.

10. The method of claim 9, wherein the step of modulating a plurality of optical channels includes externally modulating a laser produced wavelength with the broadcast signals and narrowcast signals.

11. The method of claim 1, wherein the optical channels are located at wavelengths at or near a zero dispersion wavelength of the transmission path.

12. The method of claim 1, where the optical channels are closely spaced at nonzero dispersion wavelengths of the transmission path.

13. A WDM optical transmitter comprising:
- a plurality of optical sources for generating optical channels located at different wavelengths;
- a plurality of modulators each having an input for receiving a respective one of a plurality of information-bearing broadcast signals that all embody the same broadcast information, each modulator being associated with a respective one of the plurality of optical sources to thereby provide a plurality of modulated optical channels;
- a phase shifter for adjusting a phase of at least one of the plurality of broadcast signals so that it is out of phase relative to another of the plurality of broadcast signals; and
- a multiplexer coupled to the plurality of optical sources to receive and combine the modulated optical channels to produce a multiplexed optical signal, wherein the plurality of optical channels is an odd number of optical channels.

14. The WDM optical transmitter of claim 13, wherein the phase shifter is configured to apply a phase shift of 180 degrees to said at least one of the plurality of broadcast signals relative to the remaining ones of the plurality of broadcast signals.

15. The WDM optical transmitter of claim 13, wherein the Raman induced impairments are reduced without use of other optical parameter adjustment techniques.

16. The WDM optical transmitter of claim 13,
wherein the phase shifter is configured to shift a phase of a first broadcast signal with respect to a second broadcast signal, wherein the first and second broadcast signals modulate optical channels at first and second optical wavelengths, respectively, such that Raman induced crosstalk and induced distortions are reduced at a third optical channel.

17. The WDM optical transmitter of claim 13, wherein the optical channels are located at wavelengths at or near a zero dispersion wavelength of an optical transmission path into which the optical signal is to be transmitted.

18. The WDM optical transmitter of claim 13, wherein the plurality of optical modulators are configured to receive narrowcast signals which are combined with each broadcast signal prior to modulating.

19. The WDM optical transmitter of claim 13, further including a phase controlling element which equalizes the paths of the modulated optical channels so that at least one of the modulated optical channels is out of phase with respect to the remaining modulated optical channels.

20. The WDM optical transmitter of claim 13, wherein the plurality of modulator include modulators which directly or externally modulate a laser transmitter with the broadcast signals and narrowcast signals on an optical channel.

21. The WDM optical transmitter of claim 13, wherein the wavelengths are sequential wavelengths.

22. The WDM optical transmitter of claim 13, wherein the optical channels are located at wavelengths at or near a zero dispersion wavelength of the transmission path.

23. The WDM optical transmitter of claim 13, where the optical channels are closely spaced at nonzero dispersion wavelengths of the transmission path.

* * * * *